Patented July 29, 1930

1,771,977

UNITED STATES PATENT OFFICE

HERMANN BLOMBERG, OF BERLIN-WILMERSDORF, GERMANY, ASSIGNOR TO GENERAL ELECTRIC COMPANY, A CORPORATION OF NEW YORK

WEAR-RESISTING CURRENT-CARRYING CONTACT

No Drawing. Application filed April 24, 1928, Serial No. 272,568, and in Germany May 6, 1927.

My invention relates to wear-resisting current-carrying contacts and particularly to such contacts when used as electrodes for electric welding by the resistance welding process, commonly referred to as spot welding and line welding, and for heating and upsetting rivets and the like.

In spot welding the work is commonly clamped between a pair of electrodes which exert a heavy pressure upon the work and conduct the welding current through the work, the work being brought to a welding temperature by the heating effect of the current in the work and the parts of the work being brought into molecular union by the pressure exerted upon the electrodes. In order to localize the heating effect at the desired spot the electrodes are of comparatively small contact area. In line welding, the welding current is conducted through the work by means of a pair of roller electrodes pressed against opposite sides of the work. In some cases but one roller electrode is used, a conducting mandrel being substituted for the other electrode. In this case also the contact area between the electrode and the work is relatively small in order to localize the heat and pressure. The welding currents required are relatively heavy and the current density in the electrodes in both spot and line welding is relatively high.

Heretofore such welding electrodes have customarily been made of copper for the reason that copper has a low resistance, a low capacity for forming an alloy with iron and good heat conductivity. The copper electrode thus makes a good electrical contact with the surface of the work and the heating of the electrode itself by the current passing therethrough is reduced. Copper, however, has a relatively low compressive strength and the surfaces of the roller electrodes become mushroomed or deformed with continued use and this deformation is more rapid when the electrodes heat up since the copper then becomes softer. It is therefore necessary in order to secure mechanical strength, particularly as the work becomes heavier, to use electrodes of a larger contact area than is desirable for the best localization of the heating effect between the articles to be welded together. The larger contact area moreover requires a larger pressure to bring the surfaces of the work into intimate engagement. The life of copper electrodes can be increased by resorting to water-cooling, but even by such means the electrodes can be used but for a limited time without redressing.

An object of my invention is to provide a welding electrode for spot and line welding machines and an electrode for heating and exerting pressure upon articles such as rivets and the like which electrode has good conductivity, which is capable of operation under high pressure without deformation, which will withstand high temperature without softening and which has little or no tendency to stick to the work.

According to my invention, electrodes are formed of an alloy of silver and copper. Preferably, only a small percentage of silver is used and I have found that an alloy of 94% copper and 6% silver gives very good results. The addition of a few per cent. of silver to the copper increases its hardness, decreases its alloying capacity with iron, and does not substantially decrease its conductivity. Electrodes made of my alloy have from three to eight times the life of a copper electrode.

It is believed that the increased life of electrodes made of the above silver-copper alloy may be explained by the fact that the silver-copper alloy is harder than copper under normal temperature and that the hardness decreases less rapidly with rise in temperature than does the hardness of copper with a rise in temperature. Added to this effect may also be the effect of the smaller alloying capacity of the silver-copper alloy with the iron of the work part, with corresponding decrease in tendency of the electrode to pick up metal during the welding operation.

The alloy may be made by melting, preferably under a covering of charcoal, the copper and silver in a crucible in the usual manner. Prior to casting about seventy-five thousandths of one per cent. of silicon is added to deoxidize the alloy and thereby obtain a sound casting free of blow holes. The practice in this respect is the same as that resorted to in casting copper. The amount of silicon used is intended to be just sufficient to deoxidize the alloy and the resulting alloy is substantially a copper-silver alloy. The casting thus produced may be used as the electrode of my invention, although I have found it preferable to work the casting as by hammering or pressing since this further increases the wearing qualities of the resulting electrode.

It is apparent that various modifications may be made without departing from my invention and I, therefore, aim in the appended claim to cover all such modifications as fall within the true spirit and scope of my invention.

What I claim as new and desire to secure by Letters Patent of the United States, is:—

A wear-resisting current-carrying contact formed of an alloy containing substantially the following proportions by weight: 94 per cent copper and 6 per cent silver.

In witness whereof, I have hereunto set my hand this 2nd day of April, 1928.

HERMANN BLOMBERG.